United States Patent
Guo

(10) Patent No.: US 11,129,119 B2
(45) Date of Patent: Sep. 21, 2021

(54) DATA SYNCHRONIZATION METHOD, DEVICE AND STORAGE MEDIUM

(71) Applicant: SHENZHEN GOODIX TECHNOLOGY CO., LTD., Shenzhen (CN)

(72) Inventor: Shilin Guo, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 77 days.

(21) Appl. No.: 16/680,390

(22) Filed: Nov. 11, 2019

(65) Prior Publication Data

US 2020/0145941 A1    May 7, 2020

Related U.S. Application Data

(63) Continuation of application No. PCT/CN2018/113990, filed on Nov. 5, 2018.

(51) Int. Cl.
*H04W 56/00*    (2009.01)
*H04L 29/08*    (2006.01)

(52) U.S. Cl.
CPC ......... *H04W 56/001* (2013.01); *H04L 69/324* (2013.01)

(58) Field of Classification Search
CPC ... H04W 56/001; H04L 69/324; H04L 1/0061
See application file for complete search history.

(56) References Cited

U.S. PATENT DOCUMENTS

| | | | |
|---|---|---|---|
| 2012/0301147 A1* | 11/2012 | Zhao | H04Q 11/0067 398/66 |
| 2018/0248602 A1* | 8/2018 | Kasher | H04B 7/0617 |
| 2019/0025401 A1* | 1/2019 | Vazhenin | G01S 5/12 |
| 2019/0045304 A1* | 2/2019 | Bhalla | H04R 3/00 |
| 2019/0045366 A1* | 2/2019 | Vermani | H04W 16/10 |

(Continued)

FOREIGN PATENT DOCUMENTS

| | | |
|---|---|---|
| CN | 102047594 A | 5/2011 |
| CN | 102577175 A | 7/2012 |

(Continued)

OTHER PUBLICATIONS

The first Office Action of the parallel CN application.

(Continued)

*Primary Examiner* — Brian D Nguyen
(74) *Attorney, Agent, or Firm* — J.C. Patents

(57) ABSTRACT

The present application provides a data synchronization method, a device, and a storage medium, where a wireless communication network includes: a master device and N slave devices, and the method is applied to any slave device of the N slave devices and includes: a slave device receives a data packet transmitted by the master device, the data packet including a preamble; the slave device determines a receiving termination time of the preamble, and determines, according to the receiving termination time of the preamble and a delay time configured by the master device for the slave device, a synchronization time with other slave devices in the N slave devices, thereby achieving data synchronization between the slave devices.

20 Claims, 10 Drawing Sheets

(56) References Cited

U.S. PATENT DOCUMENTS

| | | | |
|---|---|---|---|
| 2020/0019564 A1* | 1/2020 | Des Jardins | G06F 16/285 |
| 2020/0136858 A1* | 4/2020 | Rotti | G06F 13/1689 |
| 2020/0287643 A1* | 9/2020 | Fitting | H04L 25/4902 |
| 2020/0328776 A1* | 10/2020 | Scholand | H04B 1/715 |
| 2020/0351957 A1* | 11/2020 | Kim | H04L 27/2665 |

FOREIGN PATENT DOCUMENTS

| | | |
|---|---|---|
| CN | 103052031 A | 4/2013 |
| CN | 107040874 A | 8/2017 |
| CN | 107124674 A | 9/2017 |
| JP | 2015164302 A | 9/2015 |

OTHER PUBLICATIONS

The Chinese International Search Report, including Written Opinion Report of corresponding International application No. PCT/CN2018/113990, dated Jul. 29, 2019.

* cited by examiner

DATA SYNCHRONIZATION METHOD, DEVICE AND STORAGE MEDIUM

CROSS-REFERENCE TO RELATED APPLICATION

This application is a continuation of International Application No. PCT/CN2018/113990, filed on Nov. 5, 2018, the application of which is hereby incorporated by reference in its entirety.

TECHNICAL FIELD

The present application relates to the field of communications technologies, and in particular, to a data synchronization method, a device, and a storage medium.

BACKGROUND

At present, a topology involved in a wireless communication network includes: a one-to-one topology, a one-to-many topology, a many-to-many topology or the like, where in a one-to-many topology, a master device can perform data transmission with multiple slave devices. For example, a split type stereo earphone, a multi-channel wireless home theater system, and a drone cluster control system or the like all belong to a one-to-many topology.

For a one-to-many topology, data synchronization between slave devices is critical, for example, for a split type stereo earphone, a terminal, which serves as a master device, splits a left channel data packet and a right channel data packet in the music, and transmits them to a left side earphone and a right side earphone through two links (the left and right side earphones serve as slave devices), and data synchronization needs to be realized between the left and right side earphones to meet experience requirements of a user. Therefore, how to realize data synchronization between slave devices becomes a technical problem that urgently needs to be solved in the present application.

SUMMARY

The present application provides a data synchronization method, a device, and a storage medium, thereby implementing data synchronization between slave devices.

In a first aspect, the present application provides a data synchronization method for a wireless communication network, where the wireless communication network includes: a master device and N slave devices, and N is an integer greater than 1, the method is applied to any slave device of the N slave devices and includes: receiving, by a slave device, a data packet transmitted by the master device, where the data packet includes a preamble; and determining, by the slave device, a receiving termination time of the preamble, and determining, according to the receiving termination time of the preamble and a delay time configured by the master device for the slave device, a synchronization time with other slaves devices in the N slave devices, where the synchronization time is used to perform data synchronization between the slave device and the other slave devices in the N slave devices, thereby achieving data synchronization between the slave devices, and further improving a reliability of the wireless communication network.

In an embodiment, the slave device includes: a baseband, a processor, and a memory; and the receiving, by a slave device, a data packet transmitted by the master device includes: receiving, by the baseband, the data packet transmitted by the master device; and correspondingly, the determining, by the slave device, a receiving termination time of the preamble, and determining, according to the receiving termination time of the preamble and a delay time configured by the master device for the slave device, a synchronization time with other slave devices in the N slave devices includes: determining, by the baseband, the receiving termination time of the preamble, and storing the receiving termination time of the preamble to the memory, and transmitting an interrupt signal to the processor; and acquiring, by the processor, the receiving termination time of the preamble from the memory according to the interrupt signal, and determining, according to the receiving termination time of the preamble and the delay time configured by the master device for the slave device, the synchronization time with the other slave devices in the N slave devices. That is, a CPU calculates the synchronization time, thereby realizing data synchronization between the slave devices, and further improving a reliability of the wireless communication network.

In an embodiment, the data packet further includes: a cyclic redundancy check code (CRC); and correspondingly, the storing, by the baseband, the receiving termination time of the preamble to the memory, and transmitting an interrupt signal to the processor includes: storing, by the baseband, the receiving termination time of the preamble to the memory, and transmitting the interrupt signal to the processor after the baseband receives the data packet and successfully verifies the CRC. That is, after the data packet is successfully received, the baseband stores the receiving termination time of the preamble to the memory, and transmits the interrupt signal to the processor. When the data packet fails to be received, the baseband does not store the receiving termination time of the preamble to the memory, and does not transmit the interrupt signal to the processor, thereby achieving an effect of saving resources of the wireless communication network.

In an embodiment, the determining, by the processor, according to the receiving termination time of the preamble and the delay time configured by the master device for the slave device, the synchronization time with the other slave devices in the N slave devices includes: calculating, by the processor, a sum of the receiving termination time of the preamble and the delay time to obtain the synchronization time.

In an embodiment, the slave device includes a baseband; the receiving, by a slave device, a data packet transmitted by the master device includes: receiving, by the baseband, the data packet transmitted by the master device; and correspondingly, the determining, by the slave device a receiving termination time of the preamble, and determining, according to the receiving termination time of the preamble and a delay time configured by the master device for the slave device, a synchronization time with other slave devices in the N slave devices includes: determining, by the baseband, the receiving termination time of the preamble, and determining, according to the receiving termination time of the preamble and the delay time configured by the master device for the slave device, the synchronization time with the other slave devices in the N slave devices. That is, the baseband calculates the synchronization time, thereby realizing data synchronization between the slave devices, and further improving a reliability of the wireless communication network.

In an embodiment, the determining, by the baseband, according to the receiving termination time of the preamble and the delay time configured by the master device for the slave device, the synchronization time with the other slave devices in the N slave devices includes: calculating, by the baseband, a sum of the receiving termination time of the preamble and the delay time through a hardware circuit of the baseband to obtain the synchronization time.

In an embodiment, the slave device further includes: a comparison output register and a timer; transmitting, by the comparison output register, a trigger signal to the baseband to trigger the baseband to transmit a synchronization signal when the comparison output register determines that timing of the timer is as same as the synchronization time; and where the timer starts timing upon receiving of the data packet.

In an embodiment, when the slave device is a target slave device, the delay time of the slave device is greater than or equal to a receiving duration of the data packet, and the target slave device is a slave device that receives the data packet at the latest in the N slave devices; when the slave device is not the target slave device, the delay time of the slave device is a sum of a delay time of the target slave device, and a time interval between a time of the data packet received by the slave device and a time of the data packet received the target slave device.

A device, a computer storage medium, and a computer program product will be described below, and reference may be made to the above method part for the contents and effects thereof.

In a second aspect, the present application provides a device, where a wireless communication network includes: a master device and N slave devices, and N is an integer greater than 1, the device is any slave device of the N slave devices and includes: a baseband, a processor and a memory; the baseband is configured to receive a data packet transmitted by the master device, determine a receiving termination time of a preamble, and store the receiving termination time of a preamble to the memory, and transmit an interrupt signal to the processor; and the processor is configured to acquire the receiving termination time of the preamble from the memory according to the interrupt signal, and determine, according to the receiving termination time of the preamble and a delay time configured by the master device for the slave device, a synchronization time with other slave devices in the N slave devices, where the synchronization time is used to perform data synchronization between the slave device and the other slave devices in the N slave devices.

In an embodiment, the data packet further includes: a cyclic redundancy check code (CRC); and correspondingly, the baseband is specifically configured to store the receiving termination time of the preamble to the memory, and transmit the interrupt signal to the processor after the baseband receives the data packet and successfully verifies the CRC.

In an embodiment, the processor is specifically configured to calculate a sum of the receiving termination time of the preamble and the delay time to obtain the synchronization time.

In an embodiment, the delay time is a delay time configured for the slave device by the master device or the other slave devices in the N slave devices.

In a third aspect, the present application provides a device, where a wireless communication network includes: a master device and N slave devices, and N is an integer greater than 1, the device is any slave device of the N slave devices and includes a baseband; the baseband is configured to receive a data packet transmitted by the master device; and determine a receiving termination time of a preamble, and determine, according to the receiving termination time of the preamble and a delay time configured by the master device for the slave device, a synchronization time with other slave device in the N slave devices, where the synchronization time is used to perform data synchronization between the slave device and the other slave devices in the N slave devices.

In an embodiment, the baseband is specifically configured to calculate a sum of the receiving termination time of the preamble and the delay time through a hardware circuit of the baseband to obtain the synchronization time In an embodiment, the device further includes: a comparison output register and a timer; the timer is configured to start timing upon receiving of the data packet; and the comparison output register is configured to transmit a trigger signal to the baseband to trigger the baseband to transmit a synchronization signal when determining that timing of the timer is as same as the synchronization time.

In an embodiment, when the slave device is a target slave device, the delay time of the slave device is greater than or equal to a receiving duration of the data packet, and the target slave device is a slave device that receives the data packet at the latest in the N slave devices; and when the slave device is not the target slave device, the delay time of the slave device is a sum of a delay time of the target slave device, and a time interval between a time of the data packet received by the slave device and a time of the data packet received the target slave device.

In a third aspect, the present application provides a computer storage medium including computer instructions for implementing the above method of the first aspect or the optional manners of the first aspect.

In a fourth aspect, the present application provides a computer program product including computer instructions for implementing the above method of the first aspect or the optional manners of the first aspect.

The present application provides a data synchronization method, a device, and a storage medium, where a wireless communication network includes: a master device and N slave devices, and the method is applied to any slave device of the N slave devices and includes: a slave device receives a data packet transmitted by the master device, the data packet including a preamble; and the slave device determines a receiving termination time of the preamble, and determines, according to the receiving termination time of the preamble and a delay time configured by the master device for the slave device, a synchronization time with other slave devices in the N slave devices, where the synchronization time is used to perform data synchronization between the slave device and the other slave devices in the N slave devices, thereby achieving data synchronization between the slave devices, and further improving a reliability of the wireless communication network.

BRIEF DESCRIPTION OF DRAWINGS

In order to more clearly illustrate the technical solutions in embodiments of the present application or in the prior art, the drawings needed to be used in the description of the embodiments or the prior art will be briefly described below. Obviously, the drawings in the following description are some embodiments of the present application, and other drawings can be obtained according to these drawings without paying any creative effort for those skilled in the art.

DESCRIPTION OF EMBODIMENTS

In order to make the objects, technical solutions and advantages of embodiments of the present application more clear, the technical solutions in the embodiments of the present application will be clearly and completely described in combination with the drawings in the embodiments of the present application. It is apparent that the described embodiments are part of embodiments of the present application, but not all of the embodiments. All other embodiments obtained by those skilled in the art based on the embodiments of the present application without any creative effort are within the protection scope of the present application.

For a one-to-many topology, data synchronization between slave devices is critical, for example, for a split type stereo earphone, a terminal, which serves as a master device, splits a left channel data packet and a right channel data packet in the music, and transmits them to a left side earphone and a right side earphone through two links (the left and right side earphones serve as slave devices), and data synchronization needs to be realized for the left and right side earphones to meet experience requirements of a user. Therefore, how to realize data synchronization between slave devices becomes a technical problem that urgently needs to be solved in the present application.

In order to solve the above technical problem, the present application provides a data synchronization method, a device, and a storage medium. The following first describes an application scenario of the technical solution of the present application: the technical solution of the present application is applicable to a one-to-many topology, such as a split type stereo earphone, a multi-channel wireless home theater system, a drone cluster control system, or the like. These systems are summarized as a multi-link connection based, a broadcast multi-connection based, or a Sniffer multi-connection based wireless communication network.

Figure 1A:
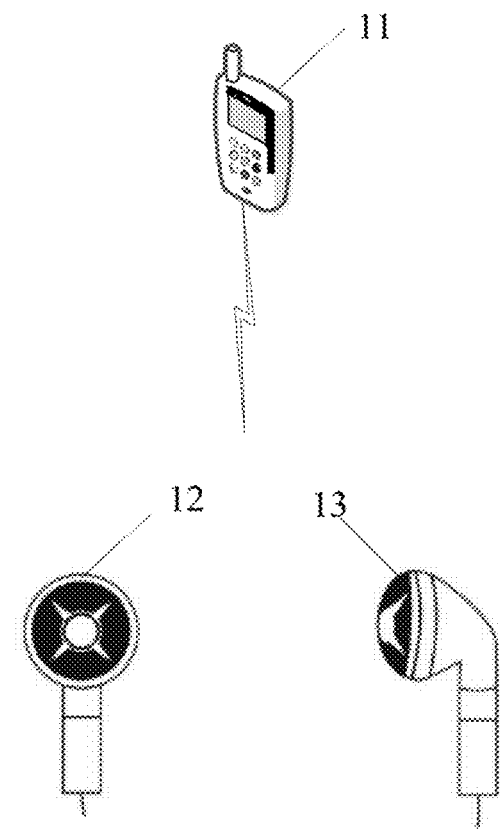
FIG. 1A is a schematic diagram of a wireless communication network based on a multi-link connection according to an embodiment of the present application.

FIG. 1A is a schematic diagram of a multi-link connection based wireless communication network according to an embodiment of the present application. As shown in FIG. 1A, a terminal 11 serves as a master device, a left side earphone 12 and a right side earphone 13 respectively serve as two slave devices of the master device. The terminal 11 can establish different links for the left side earphone 12 and the right side earphone 13, respectively, and realize data transmission with the two earphones through the respective links of the two earphones.

Figure 1B:
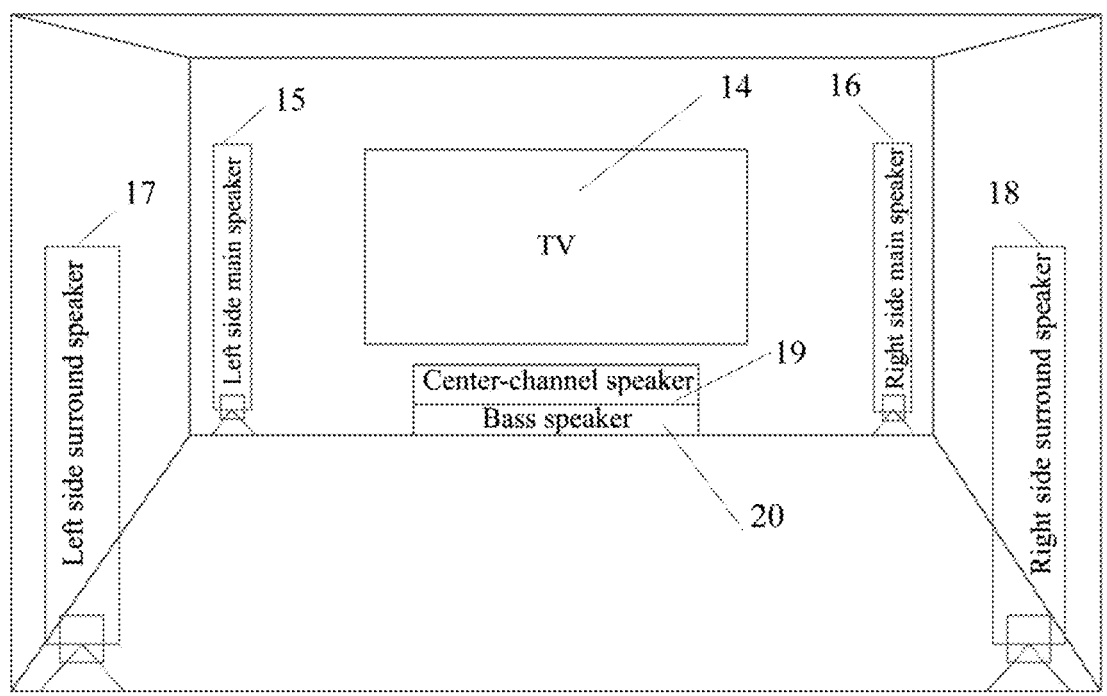
FIG. 1B is a schematic diagram of a multi-link connection based wireless communication network according to another embodiment of the present application.

FIG. 1B is a schematic diagram of a multi-link connection based wireless communication network according to another embodiment of the present application. As shown in FIG. 1B, a TV 14 serves as a master device, a left side main speaker 15, a right side main speaker 16, a left side surround speaker 17, a right side surround speaker 18, a center-channel speaker 19 and a bass speaker 20 respectively serve as slave devices of the master device, the TV 14 can respectively establish different links for the left side main speaker 15, the right side main speaker 16, the left side surround speaker 17, the right side surround speaker 18, the center-channel speaker 19 and the bass speaker 20, and realize data transmission among the master device and the left side main speaker 15, the right side main speaker 16, the left side surround speaker 17, the right side surround speaker 18, the center-channel speaker 19 and the bass speaker 20 through respective links.

Figure 1C:
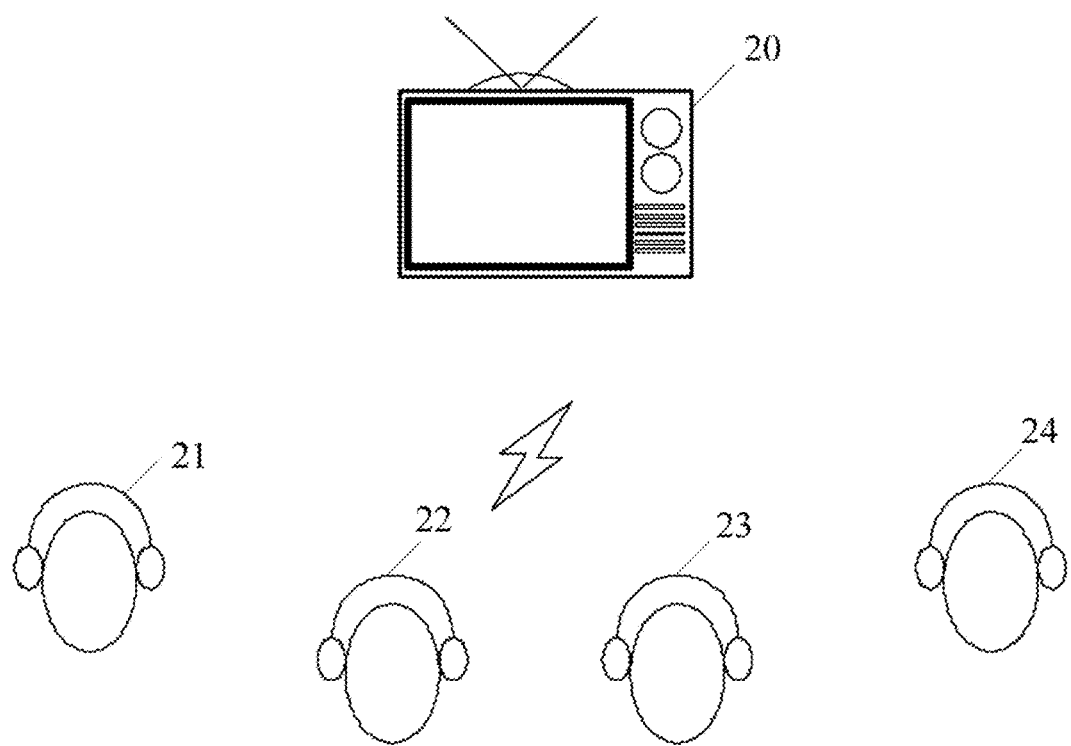
FIG. 1C is a schematic diagram of a broadcast multi-connection based wireless communication network according to an embodiment of the present application.

FIG. 1C is a schematic diagram of a broadcast multi-connection based wireless communication network according to an embodiment of the present application. As shown in FIG. 1C, a TV 20 serves as a master device, a terminal 21, a terminal 22, a terminal 23, and a terminal 24 serve as slave devices of the TV 20, respectively. The TV 20 can transmit data packets to the terminal 21, the terminal 22, the terminal 23, and the terminal 24 by means of broadcasting.

The present application is also applicable to a Sniffer multi-connection based wireless communication network, where the Sniffer multi-connection based wireless communication network includes a master device and a plurality of slave devices, and one of the slave devices may be referred to as a sniffing device (Sniffer), the sniffing device can receive all packets (including packets transmitted by other slave devices to the master device) through sniffing links.

Figure 2A:
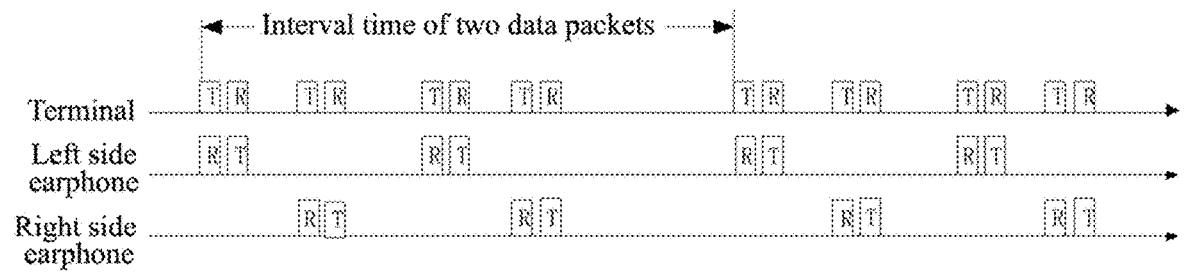
FIG. 2A is a schematic diagram of a data transmission manner according to an embodiment of the present application.

For the above four wireless communication networks, the following describes their data transmission manners:

FIG. 2A is a schematic diagram of a data transmission manner according to an embodiment of the present application. As shown in FIG. 2A, the data transmission manner is applicable to the wireless communication network shown in FIG. 1A. Specifically, T shown in FIG. 2A represents transmitted (Transmit, T) data packets, R represents received (Receive, R) data packets, the terminal can transmit data packets to the left side earphone and the right side earphone, or receive data packets transmitted by the left side earphone and the right side earphone. It should be noted that data transmission is implemented through electromagnetic waves in the wireless communication network, and electromagnetic waves are transmitted at a speed of light; therefore, in the present application, when the master device transmits a data packet to the slave device, the time at which the master device transmits the data packet and the time at which the slave device receives the data packet are considered the same. Similarly, when the slave device transmits a data packet to the master device, it is considered that the time at which the slave device transmits the data packet is as same as the time at which the master device receives the data packet. In combination with the wireless communication network of FIG. 1A, since the distance from the terminal to the left and right side earphones is usually less than 10 meters, the electromagnetic wave is transmitted at a speed of light of $3.0*10^8$ m/s, and the maximum transmission error is 33.3 nanoseconds. Therefore, as shown in FIG. 2A, it can be considered that the time at which the terminal transmits a first packet to the left side earphone is as same as the time at which the left side earphone receives the first data packet.

Figure 2B:
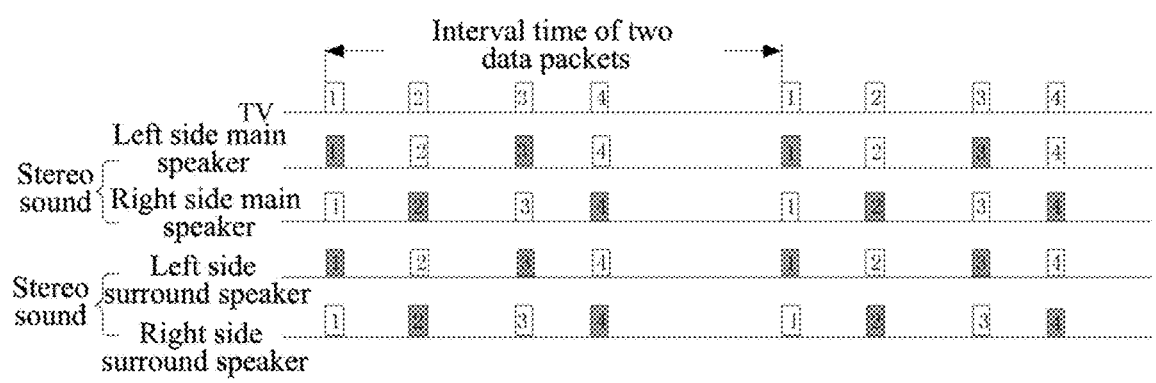
FIG. 2B is a schematic diagram of a data transmission manner according to another embodiment of the present application.

FIG. 2B is a schematic diagram of a data transmission manner according to another embodiment of the present application. As shown in FIG. 2B, the data transmission manner is applicable to the wireless communication network shown in FIG. 1B, specifically, 1, 2, 3, and 4 shown in FIG. 2B represent four different data packets, respectively. Where a TV can transmit data packets 1, 2, 3 and 4 to the left side main speaker, the right side main speaker, the left side surround speaker and the right side surround speaker, while the left side main speaker and the right side main speaker will play a left channel sound and a right channel sound to form a stereo sound. Therefore, the left side main speaker retains a data packet 1 and a data packet 3 (the data packets indicated by gray in FIG. 2B are retained data packets), and shields a data packet 2 and a data packet 4. Similarly, the left side surround speaker and the right side surround speaker will play a left channel surround sound and a right channel surround sound to form a stereo sound, and therefore, the left side surround speaker retains a data packet 1 and a data packet 3 (the data packets indicated by gray in FIG. 2B are retained data packets), and shields a data packet 2 and a data packet 4. As shown in FIG. 2B, for the same data packet, the time at which the TV transmits the data packet to the left side main speaker, the right side main speaker, the left side surround speaker, and the right side surround speaker is as same as the time at which these speakers receive the data packet.

Figure 2C:
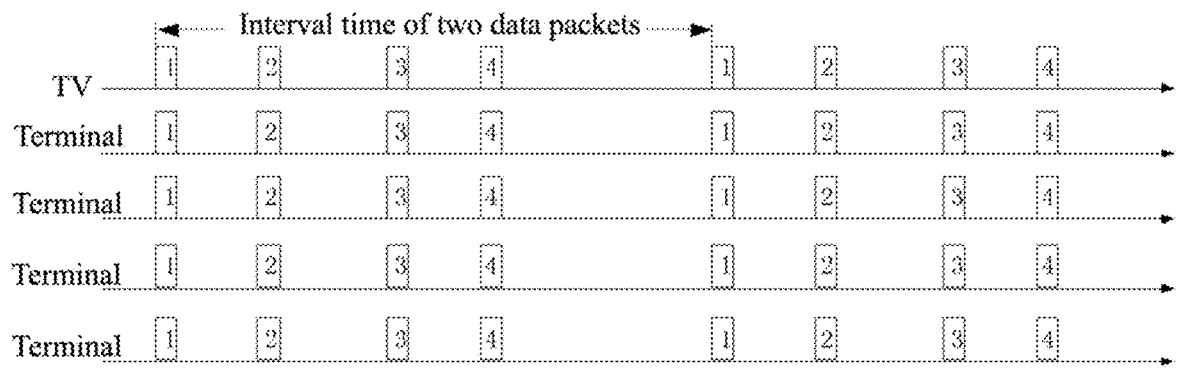
FIG. 2C is a schematic diagram of a data transmission manner according to still another embodiment of the present application.

FIG. 2C is a schematic diagram of a data transmission manner according to still another embodiment of the present application. As shown in FIG. 2C, the data transmission manner is applicable to the wireless communication network shown in FIG. 1C. Specifically, 1, 2, 3, and 4 shown in FIG. 2C represent four different data packets, respectively. Where a TV can broadcast data packets 1, 2, 3 and 4 to four terminals. As shown in FIG. 2C, for the same data packet, the time at which the TV transmits the data packet to the four terminals is as same as the time at which the terminals receive the data packet.

Figure 2D:
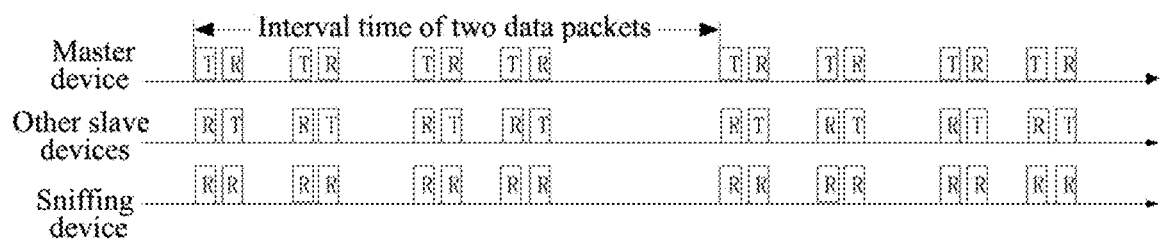
FIG. 2D is a schematic diagram of a data transmission manner according to yet another embodiment of the present application.

As described above, the present application is also applicable to a Sniffer multi-connection based wireless communication network. FIG. 2D is a schematic diagram of a data transmission manner according to yet another embodiment of the present application. As shown in FIG. 2D, the data transmission manner is applicable to a Sniffer multi-connection based wireless communication network, based on this, as shown in FIG. 2D, T represents transmitted data packets, R represents received data packets, and for the sniffing device, it receives data packets transmitted between the master device and other slave devices. Where the sniffing device can be seen as a special slave device, and the sniffing device is different from other slave devices in that the sniffing device can receive all the data packets transmitted between the master device and other slave devices.

Further, the present application can be applied to a personal local area network, such as a local area network where a split wireless stereo earphone is located, a local area network where a multi-person voice communication service is located, and can also be applied to a multi-user data packet sharing scenario, such as a multi-person wireless video application; and a cluster control, such as a drone cluster control. The present application can be applicable to various wireless communication standards such as Bluetooth (including classic Bluetooth and low power Bluetooth), WIFI, Zigbee or the like.

It should be noted that the above-mentioned wireless communication networks and data transmission manners are merely exemplary descriptions, and the technical solutions of the present application are not limited to the above-mentioned wireless communication networks, data transmission manners, or the like.

The technical solutions of the present application will be described in detail below in combination with the above-mentioned wireless communication networks and data transmission manners.

Embodiment 1

Figure 3:
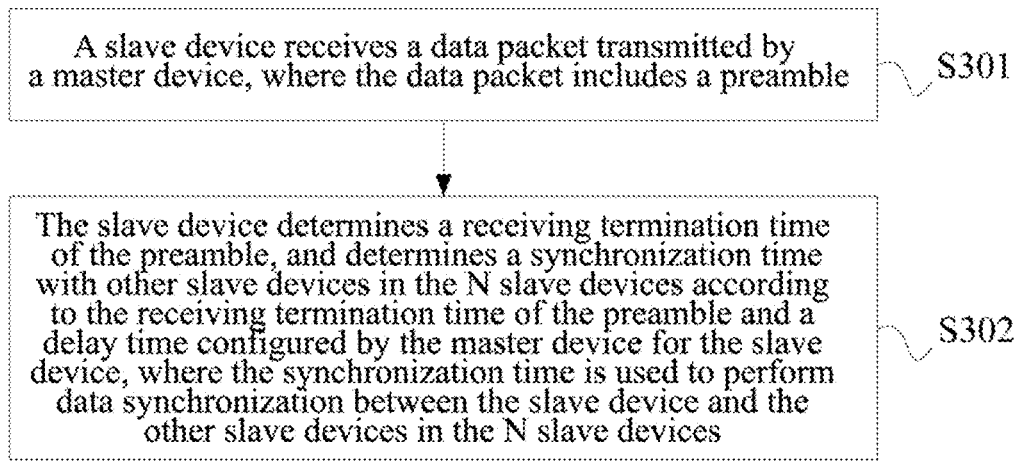
FIG. 3 is a flowchart of a data synchronization method according to an embodiment of the present application.

FIG. 3 is a flowchart of a data synchronization method according to an embodiment of the present application, where a wireless communication network includes: a master device and N slave devices, and N is an integer greater than 1, the wireless communication networks as shown in FIGS. 1A, 1B, and 1C or the Sniffer multi-connection based wireless communication network, the method is applied to any slave device of the N slave devices or a sniffer device. As shown in FIG. 3, the method includes the following steps:

Step S301: a slave device receives a data packet transmitted by the master device, where the data packet includes a preamble.

Step S302: the slave device determines a receiving termination time of the preamble, and determines a synchronization time with other slave devices in the N slave devices according to the receiving termination time of the preamble and a delay time configured by the master device for the slave device, where the synchronization time is used to perform data synchronization between the slave device and the other slave devices in the N slave devices.

Figure 4:
FIG. 4 is a schematic diagram of a data packet according to an embodiment of the present application.

In an embodiment, FIG. 4 is a schematic diagram of a data packet according to an embodiment of the present application. As shown in FIG. 4, the data packet includes: a preamble, an access code (AC), a protocol data unit (PDU) and a cyclic redundancy check (CRC).

For the above-mentioned preamble, it may be divided into two formats including 1M and 2M according to the actual physical layer used. For the 1M format, the preamble may be 10101010 or 01010101. For the 2M format, the preamble may be 1010101010101010 or 0101010101010101.

Where after determining the receiving termination time of the preamble, the slave device may store the receiving termination time of the preamble in a memory.

In an embodiment, the delay time is a delay time configured by the master device for the slave device. For example, for the wireless communication networks shown in FIG. 1A, FIG. 1B, and FIG. 1C and the Sniffer multi-connection based wireless communication network, the delay time may be a delay time configured by the master device for the slave device.

Assuming that data synchronization needs to be implemented between multiple slave devices, each slave device corresponds to a data packet to be synchronized, and a slave device that receives a corresponding data packet at the latest is referred as a target slave device. Based on this, when the slave device is the target slave device, the delay time of the slave device is greater than or equal to a receiving duration of the data packet, and the target slave device is a slave device that receives the data packet at the latest in the N slave devices; when the slave device is not the target device, the delay time of the slave device is a sum of a delay time of the target slave device and a time interval between a time of the data packet received by the slave device and a time of the data packet received the target slave device.

Figure 5A:
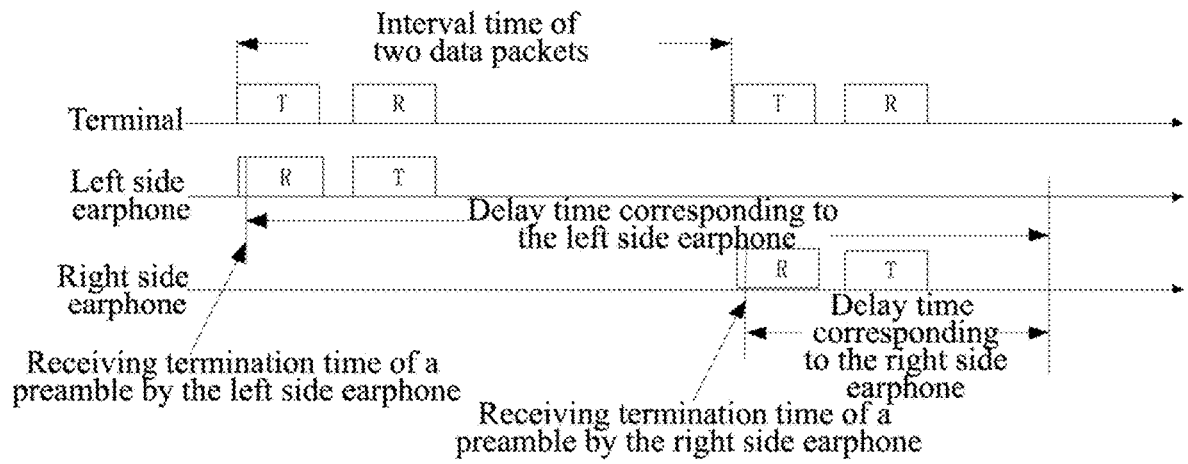
FIG. 5A is a schematic diagram of multi-link connection based data synchronization according to an embodiment of the present application.

Specifically, FIG. 5A is a schematic diagram of multi-link connection based data synchronization according to an embodiment of the present application, for example, the multi-link connection based wireless communication network shown in FIG. 1A, and as shown in FIG. 5A, a terminal (serving as a master device) transmits data packets to a left side earphone and the right side earphone (serving as two slave devices of the terminal respectively), where as shown in FIG. 5A, the right side earphone receives the data packet later than the left side earphone, based on this, the terminal may first calculate a delay time corresponding to the right side earphone, and the delay time needs to be greater than or equal to a receiving duration of the corresponding data packet (the "R" corresponding to the right side earphone shown in FIG. 5A) of the right side earphone. Secondly, the terminal calculates a delay time corresponding to the left side earphone, and the delay time is equal to a sum of the delay time of the right side earphone and a receiving time interval (as shown in FIG. 5A, a first "T" corresponding to the terminal is a first "R" corresponding to the left side earphone, and a second "T" corresponding to the terminal is a first "R" corresponding to the right side earphone. Therefore, a time interval of two data packets is a time interval of two "T" corresponding to the terminal) of two data packets corresponding to the left side earphone and the right side earphone respectively. Certainly, the delay time may also be a value set by the master device according to the actual situation, which is not limited in present application.

Figure 5B:
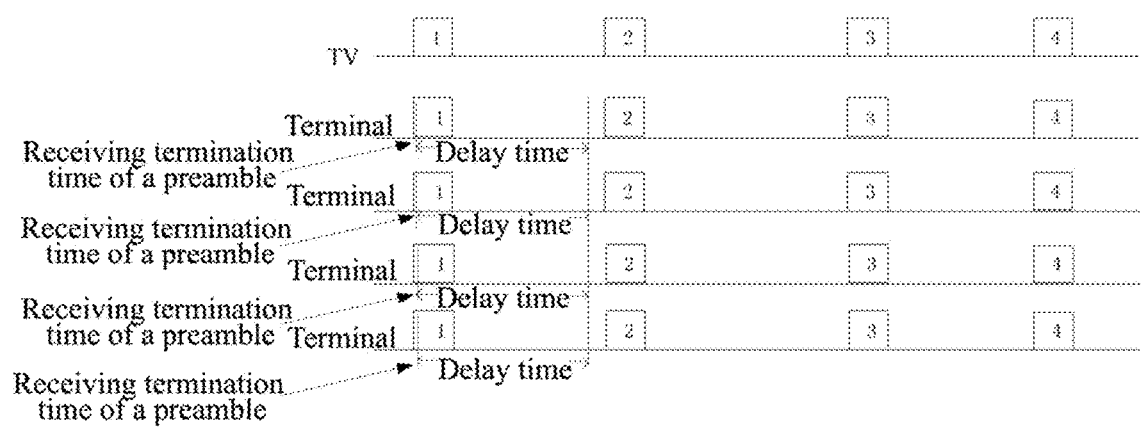
FIG. 5B is a schematic diagram of broadcast multi-connection based data synchronization according to an embodiment of the present application.

Further, as shown in FIG. 5A, the receiving termination times of the preamble by the left side earphone and the right side earphone are different, which is due to that for example, in the multi-link connection based wireless communication network shown in FIG. 1A, since it is multi-link connection, and each link is independent to each other, thus the receiving termination times of the preamble by the left side earphone and the right side earphone are different. However, FIG. 5B is a schematic diagram of broadcast multi-connection based data synchronization according to an embodiment of the present application. In combination with FIG. 1C, since the TV transmits data packets to four terminals by means of broadcasting, the receiving termination times of the preamble by the four terminals are the same. However, considering the delay in actual use caused by a decoding delay, a data packet loss, or the like, the delay times configured by the TV for the four terminals are the same.

Figure 5C:
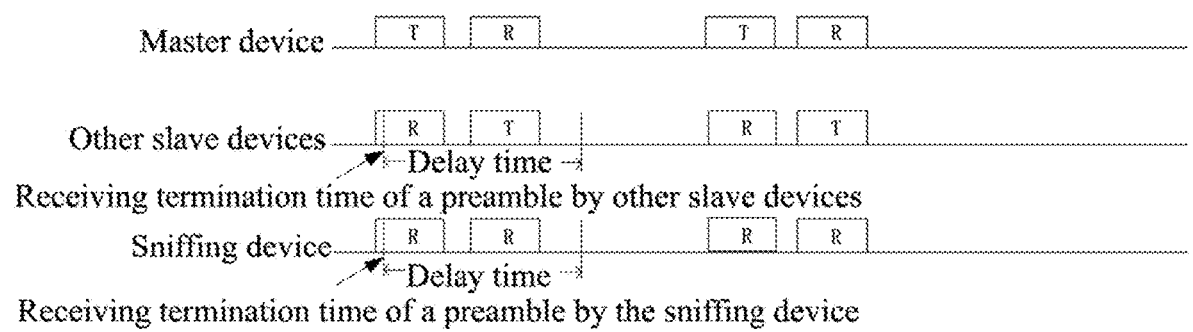
FIG. 5C is a schematic diagram of Sniffer multi-connection based data synchronization according to an embodiment of the present application.

Similarly, FIG. 5C is a schematic diagram of Sniffer multi-connection based data synchronization according to an embodiment of the present application, and is combined with a Sniffer multi-connection based wireless communication network, where the receiving termination times of the preamble by other slave devices and a sniffing device are the same. However, considering the delay in actual use caused by a decoding delay, a data packet loss or the like, the delay times configured by the master device for other slave devices and the sniffing device are the same.

In an embodiment, the slave device determining a synchronization time with other slave devices in the N slave devices according to the receiving termination time of the preamble and a delay time configured by the master device for the slave device includes: the slave device calculates a sum of the receiving termination time of the preamble and the delay time to obtain the synchronization time. Alternatively, the slave device calculates a sum of the receiving termination time of the preamble, the delay time, and a preset value to obtain the synchronization time. Where the preset value may be set by the master device according to the actual situation, for example, the preset value may be 1 ms, 2 ms, or the like, which is not limited in the embodiment of the present application.

In an embodiment, after the slave device determines the synchronization time, the method further includes: the slave device performs data synchronization with the other slave devices in the N slave devices from the synchronization time, for example, the slave device and the other slave devices simultaneously play music or the like from the synchronization time, which is not limited in the embodiment of the present application.

In summary, the embodiment of the present application provides a data synchronization method, where the method includes: a slave device receives a data packet transmitted by a master device, the data packet including a preamble; the slave device determines a receiving termination time of a preamble, and determines a synchronization time with the other slave devices in the N slave devices according to the receiving termination time of the preamble and a delay time configured by the master device for the slave device, so that the slave device can perform data synchronization with the other slave devices in the N slave devices. In turn, a reliability of the wireless communication network can be improved.

Embodiment 2

Figure 6:
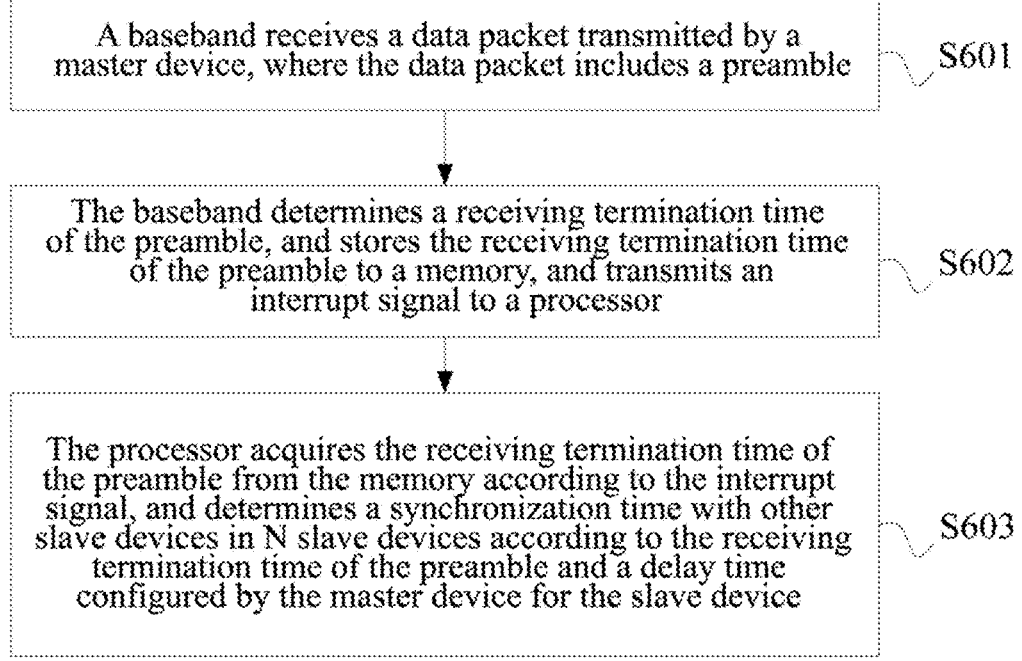
FIG. 6 is a flowchart of a data synchronization method according to another embodiment of the present application.

Based on the first embodiment, the slave device further includes: a baseband, a processor, and a memory. FIG. 6 is a flowchart of a data synchronization method according to another embodiment of the present application. As shown in FIG. 6, the method includes the following steps:

Step S601: the baseband receives a data packet transmitted by the master device, where the data packet includes a preamble;

Step S602: the baseband determines a receiving termination time of the preamble, and stores the receiving termination time of the preamble to the memory, and transmits an interrupt signal to the processor.

Step S603: the processor acquires the receiving termination time of the preamble from the memory according to the interrupt signal, and determines a synchronization time with other slave devices in N slave devices according to the receiving termination time of the preamble and a delay time configured by the master device for the slave device.

Specifically, the foregoing interrupt signal is configured to indicate the processor to acquire the receiving termination time of the preamble from the memory.

In an optional manner: once the baseband receives the preamble, the baseband stores the receiving termination time of the preamble to the memory, and transmits the interrupt signal to the processor.

In another optional manner, after the baseband receives the data packet and successfully verifies the CRC, the baseband stores the receiving termination time of the preamble to the memory, and transmits the interrupt signal to the processor.

In an embodiment, the processor determining the synchronization time with the other slave devices in the N slave devices according to the receiving termination time of the preamble and the delay time configured by the master device for the slave device includes: the processor calculates a sum of the receiving termination time of the preamble and the delay time to obtain the synchronization time. Alternatively, the processor calculates a sum of the receiving termination time of the preamble, the delay time, and a preset value to obtain the synchronization time. The preset value may be set by the master device according to the actual situation, for example, the preset value may be 1 ms, 2 ms, or the like, which is not limited in this embodiment of the present application.

In an embodiment, after the processor determines the synchronization time, the method further includes: the processor performs data synchronization with the other slave devices in the N slave devices from the synchronization time. Alternatively, the baseband in the slave device transmits a synchronization signal from the synchronization time to a codec chip in the slave device to implement the data synchronization between the slave device and other slave devices.

Further, the data synchronization method provided by this embodiment is applicable to the foregoing multi-link connection based, broadcast multi-connection based, and Sniffer multi-connection based wireless communication networks, but is not limited to the four wireless communication networks.

In summary, the embodiment of the present application provides a data synchronization method, including: a baseband receives a data packet transmitted by a master device; the baseband determines a receiving termination time of a preamble, stores the receiving termination time of the preamble to a memory, and transmits an interrupt signal to a processor; the processor acquires the receiving termination time of the preamble from the memory according to the interrupt signal, and determines a synchronization time with other slave devices in the N slave devices according to the receiving of the preamble and the delay time configured by the master device for the slave device, so that the slave device can perform data synchronization with the other slave devices in the N slave devices. In turn, a reliability of the wireless communication network can be improved.

Embodiment 3

Figure 7:
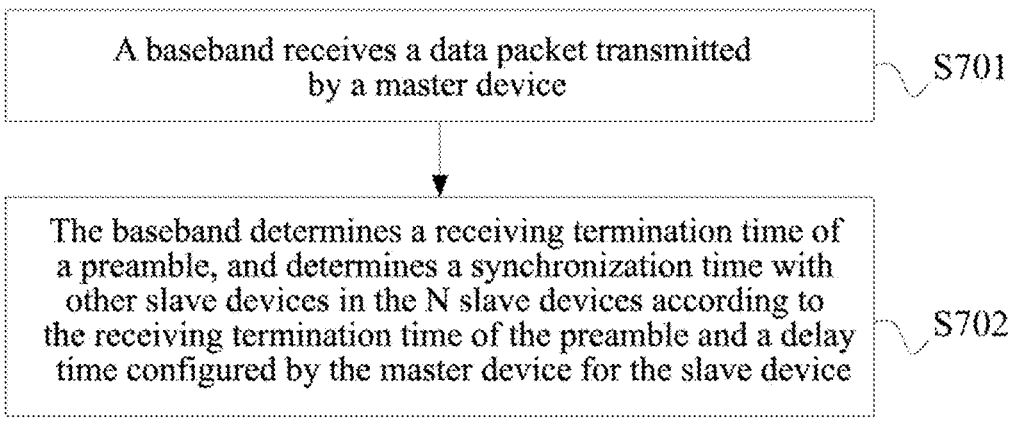
FIG. 7 is a flowchart of a data synchronization method according to still another embodiment of the present application.

Based on the first embodiment, the slave device further includes a baseband. FIG. 7 is a flowchart of a data synchronization method according to still another embodiment of the present application. As shown in FIG. 7, the method includes the following steps:

Step S701: the baseband receives a data packet transmitted by the master device.

Step S702: the baseband determines a receiving termination time of the preamble, and determines a synchronization time with other slave devices in the N slave devices according to the receiving termination time of the preamble and a delay time configured by the master device for the slave device.

In an embodiment, the baseband determining the synchronization time with the other slave devices in the N slave devices according to the receiving termination time of the preamble and a delay time configured by the master device for the slave device includes: the baseband calculates a sum of the receiving termination time of the preamble and the delay time through a hardware circuit to obtain the synchronization time. Alternatively, the baseband calculates a sum of the receiving termination time of the preamble, the delay time, and a preset value through the hardware circuit. The preset value may be set by the master device according to the actual situation, for example, the preset value may be 1 ms, 2 ms, or the like, which is not limited in this embodiment of the present application.

In an embodiment, the slave device further includes: a comparison output register and a timer; when the comparison output register determines that timing of the timer is as same as the synchronization time, the comparison output register transmits a trigger signal to the baseband to trigger the baseband to transmit a synchronization signal, and the timer starts timing upon receiving of the data packet transmitted by the master device. The baseband of the slave device can transmit the synchronization signal to a codec chip in the slave device to implement data synchronization between the slave device and other slave devices, for example, to achieve synchronous play between the slave device and other slave devices.

Further, the data synchronization method provided by this embodiment is applicable to the foregoing multi-link connection based, broadcast multi-connection based, and Sniffer multi-connection based wireless communication networks, but is not limited to the four wireless communication networks.

In summary, the embodiment of the present application provides a data synchronization method, including: a baseband receives a data packet transmitted by a master device; the baseband determines a receiving termination time of a preamble, and determines a synchronization time with other slave devices in N slave devices according to the receiving termination time of the preamble and a delay time configured by the master device for a slave device to perform data synchronization between the slave device and other slave devices in the N slave devices. In turn, a reliability of the wireless communication network can be improved.

Embodiment 4

Figure 8:
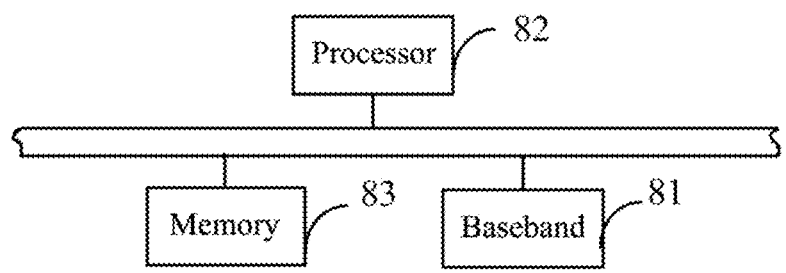
FIG. 8 is a schematic structural diagram of a device according to an embodiment of the present application.

FIG. 8 is a schematic structural diagram of a device according to an embodiment of the present application, where a wireless communication network includes: a master device and N slave devices, and N is an integer greater than 1, the device is any slave device of the N slave devices, the device includes a baseband 81, a processor 82, and a memory 83.

The baseband 81 is configured to receive a data packet transmitted by the master device, determine a receiving termination time of a preamble, and store the receiving termination time of the preamble to the memory 83, and transmit an interrupt signal to the processor 82.

The processor 82 is configured to acquire the receiving termination time of the preamble from the memory 83 according to the interrupt signal, and determine a synchronization time with other slave devices in the N slave devices according to the receiving termination time of the preamble and a delay time configured by the master device for the slave device, where the synchronization time is used to perform data synchronization between the slave device and the other slave devices in the N slave devices.

In an embodiment, the data packet further includes: a cyclic redundancy check code (CRC); correspondingly, the baseband 81 is specifically configured to: store the receiving termination time of the preamble to the memory 83, and transmit the interrupt signal to the processor 82 after the baseband 81 receives the data packet and successfully verifies the CRC.

In an embodiment, the processor 82 is specifically configured to: calculate a sum of the receiving termination time of the preamble and the delay time to obtain the synchronization time.

In an embodiment, when the slave device is a target slave device, the delay time of the slave device is greater than or equal to a receiving duration of the data packet, and the target slave device is a slave device that receives the data packet at the latest in the N slave devices; when the slave device is not the target slave device, the delay time of the slave device is a sum of a delay time of the target slave device and a time interval between a time of the data packet received by the slave device and a time of the data packet received the target slave device.

The device provided by the embodiment of the present application may be used to perform the method in the foregoing Embodiment 1 or Embodiment 2. Reference may be made to Embodiment 1 or Embodiment 2 for the content and effect thereof, and details are not described herein again.

Embodiment 5

Figure 9:
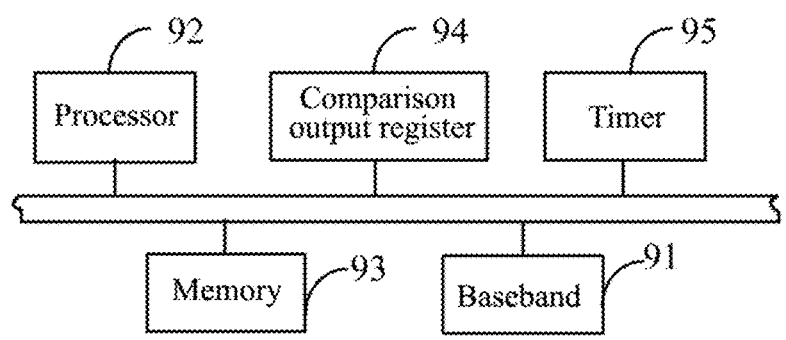
FIG. 9 is a schematic structural diagram of a device according to another embodiment of the present application.

FIG. 9 is a schematic structural diagram of a device according to another embodiment of the present application, where a wireless communication network includes: a master device and N slave devices, and N is an integer greater than 1, the device is any slave device of the N slave devices, the device includes: a baseband 91, a processor 92, and a memory 93.

The baseband 91 is configured to receive a data packet transmitted by the master device, determine a receiving termination time of a preamble, and determine a synchronization time with other slave devices in the N slave devices according to the receiving termination time of the preamble and a delay time configured by the master device for the slave device, where the synchronization time is used to perform data synchronization between the slave device and the other slave devices in the N slave devices.

In an embodiment, the baseband 91 is specifically configured to: calculate a sum of the receiving termination time of the preamble and the delay time through a hardware circuit of the baseband 91 to obtain the synchronization time.

In an embodiment, the slave device further includes: a comparison output register 94 and a timer 95. The timer 95 is configured to start timing upon receiving of the data packet transmitted by the master device. The comparison output register 94 is configured to transmit a trigger signal to the baseband 91 to trigger the baseband 91 to transmit a synchronization signal when determining that timing of the timer is as same as the synchronization time.

In an embodiment, when the slave device is a target slave device, the delay time of the slave device is greater than or equal to a receiving duration of the data packet, and the target slave device is a slave device that receives the data packet at the latest in the N slave devices; when the slave device is not the target slave device, the delay time of the slave device is a sum of a delay time of the target slave device and a time interval between a time of the data packet received by the slave device and a time of the data packet received the target slave device.

In an embodiment, the baseband 91 can store the receiving termination time of the preamble into the memory 93.

In an embodiment, the baseband 91 can transmit the synchronization time or the synchronization signal to the processor 92 or other processors or chips to implement data synchronization between the slave device and the other slave devices.

The device provided by the embodiment of the present application may be used to perform the method of the foregoing Embodiment 1 or Embodiment 3. Reference may be made to Embodiment 1 or Embodiment 3 for the content and effect thereof, and details are not described herein again.

Embodiment 6

The present application further provides a computer storage medium, including computer instructions which are configured to implement the data synchronization method described above, and reference may be made to Embodiment 1, Embodiment 2 or Embodiment 3 for the content and effect thereof, and details are not described herein again.

Embodiment 7

The present application further provides a computer program product, including computer instructions which are configured to implement the data synchronization method described above, and reference may be made to Embodiment 1, Embodiment 2 or Embodiment 3 for the content and effect thereof, and details are not described herein again.

One of ordinary skill in the art will appreciate that all or part of the steps to implement the various method embodiments described above may be accomplished through a hardware relate to the program instructions. The foregoing program can be stored in a computer readable storage medium. The program, when executed, performs the steps including the foregoing method embodiments; and the foregoing storage medium includes various media that can store program codes, such as a ROM, a RAM, a magnetic disk, or an optical disk.

Finally, it should be noted that the above various embodiments are merely intended for describing, rather than limiting, the technical solutions of the present application; although the present application has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present application.

What is claimed is:

1. A data synchronization method for a wireless communication network, wherein the wireless communication network comprises: a master device and N slave devices, and N is an integer greater than 1, the method is applied to any slave device of the N slave devices and comprises:
   receiving, by a slave device, a data packet transmitted by the master device, wherein the data packet comprises a preamble; and determining, by the slave device, a receiving termination time of the preamble, and determining, according to the receiving termination time of the preamble and a delay time configured by the master device for the slave device, a synchronization time with other slave devices in the N slave devices, wherein the synchronization time is used to perform data synchronization between the slave device and the other slave devices in the N slave devices;

wherein the slave device comprises: a baseband, a processor, and a memory;

the receiving, by a slave device, a data packet transmitted by the master device comprises:

receiving, by the baseband, the data packet transmitted by the master device;

correspondingly, the determining, by the slave device, a receiving termination time of the preamble, and determining, according to the receiving termination time of the preamble and a delay time configured by the master device for the slave device, a synchronization time with other slave devices in the N slave devices comprises:

determining, by the baseband, the receiving termination time of the preamble, and storing the receiving termination time of the preamble to the memory, and transmitting an interrupt signal to the processor; and acquiring, by the processor, the receiving termination time of the preamble from the memory according to the interrupt signal, and determining, according to the receiving termination time of the preamble and the delay time configured by the master device for the slave device, the synchronization time with the other slave devices in the N slave devices.

2. The method according to claim 1, wherein the data packet further comprises: a cyclic redundancy check (CRC); and correspondingly, the storing, by the baseband, the receiving termination time of the preamble to the memory, and transmitting an interrupt signal to the processor comprises:

storing, by the baseband, the receiving termination time of the preamble to the memory, and transmitting the interrupt signal to the processor after the baseband receives the data packet and successfully verifies the CRC.

3. The method according to claim 1, wherein the determining, by the processor, according to the receiving termination time of the preamble and the delay time configured by the master device for the slave device, the synchronization time with the other slave devices in the N slave devices comprises:

calculating, by the processor, a sum of the receiving termination time of the preamble and the delay time to obtain the synchronization time.

4. The method according to claim 1, wherein:

in a condition that the slave device is a target slave device, the delay time of the slave device is greater than or equal to a receiving duration of the data packet, and the target slave device is a slave device that receives the data packet at the latest in the N slave devices; and in a condition that the slave device is not the target slave device, the delay time of the slave device is a sum of a delay time of the target slave device, and a time interval between a time of the data packet received by the slave device and a time of the data packet received by the target slave device.

5. The method according to claim 1, wherein the receiving termination time of the preamble by the slave device is different from receiving termination times of preambles by the other slave devices in the N slave devices.

6. The method according to claim 1, wherein delay times configured by the master device for the N slave devices are the same.

7. The method according to claim 1, wherein the determining, according to the receiving termination time of the preamble and the delay time configured by the master device for the slave device, the synchronization time with the other slave devices in the N slave devices comprises:

calculating, by the processor, a sum of the receiving termination time of the preamble, the delay time and a preset value to obtain the synchronization time.

8. A data synchronization method for a wireless communication network, wherein the wireless communication network comprises: a master device and N slave devices, and N is an integer greater than 1, the method is applied to any slave device of the N slave devices, wherein the slave device comprises a baseband, the method comprises:

receiving, by the baseband, a data packet transmitted by the master device, wherein the data packet comprises a preamble; and determining, by the baseband, a receiving termination time of the preamble, and determining, according to the receiving termination time of the preamble and a delay time configured by the master device for the slave device, a synchronization time with the other slave devices in the N slave devices; wherein the synchronization time is used to perform data synchronization between the slave device and the other slave devices in the N slave devices;

wherein the slave device further comprises: a comparison output register and a timer;

transmitting, by the comparison output register, a trigger signal to the baseband to trigger the baseband to transmit a synchronization signal when the comparison output register determines that timing of the timer is as same as the synchronization time; and wherein the timer starts timing upon receiving of the data packet.

9. The method according to claim 8, wherein the determining, according to the receiving termination time of the preamble and a delay time configured by the master device for the slave device, a synchronization time with the other slave devices in the N slave devices comprises:

calculating, by the baseband, a sum of the receiving termination time of the preamble and the delay time through a hardware circuit of the baseband to obtain the synchronization time.

10. The method according to claim 8, wherein:

in a condition that the slave device is a target slave device, the delay time of the slave device is greater than or equal to a receiving duration of the data packet, and the target slave device is a slave device that receives the data packet at the latest in the N slave devices; and in a condition that the slave device is not the target slave device, the delay time of the slave device is a sum of a delay time of the target slave device, and a time interval between a time of the data packet received by the slave device and a time of the data packet received the target slave device.

11. The method according to claim 8, wherein the receiving termination time of the preamble by the slave device is different from receiving termination times of preambles by the other slave devices in the N slave devices.

12. The method according to claim 8, wherein delay times configured by the master device for the N slave devices are the same.

13. The method according to claim 8, wherein the determining, according to the receiving termination time of the preamble and a delay time configured by the master device for the slave device, a synchronization time with the other slave devices in the N slave devices comprises:
- calculating, by the baseband, a sum of the receiving termination time of the preamble, the delay time and a preset value through a hardware circuit of the baseband to obtain the synchronization time.

14. A data synchronization method for a wireless communication network, wherein the wireless communication network comprises: a master device and N slave devices, and N is an integer greater than 1, the method is applied to any slave device of the N slave devices and comprises:
- receiving, by a slave device, a data packet transmitted by the master device, wherein the data packet comprises a preamble; and
- determining, by the slave device, a receiving termination time of the preamble, and determining, according to the receiving termination time of the preamble and a delay time configured by the master device for the slave device, a synchronization time with other slave devices in the N slave devices, wherein the synchronization time is used to perform data synchronization between the slave device and the other slave devices in the N slave devices;

wherein:
- in a condition that the slave device is a target slave device, the delay time of the slave device is greater than or equal to a receiving duration of the data packet, and the target slave device is a slave device that receives the data packet at the latest in the N slave devices; and
- in a condition that the slave device is not the target slave device, the delay time of the slave device is a sum of a delay time of the target slave device, and a time interval between a time of the data packet received by the slave device and a time of the data packet received the target slave device.

15. The method according to claim 14, wherein the slave device comprises: a baseband, a processor, and a memory;
the receiving, by a slave device, a data packet transmitted by the master device comprises:
- receiving, by the baseband, the data packet transmitted by the master device;

correspondingly, the determining, by the slave device, a receiving termination time of the preamble, and determining, according to the receiving termination time of the preamble and a delay time configured by the master device for the slave device, a synchronization time with other slave devices in the N slave devices comprises:
- determining, by the baseband, the receiving termination time of the preamble, and storing the receiving termination time of the preamble to the memory, and transmitting an interrupt signal to the processor; and
- acquiring, by the processor, the receiving termination time of the preamble from the memory according to the interrupt signal, and determining, according to the receiving termination time of the preamble and the delay time configured by the master device for the slave device, the synchronization time with the other slave devices in the N slave devices;

wherein the data packet further comprises: a cyclic redundancy check (CRC); and correspondingly, the storing, by the baseband, the receiving termination time of the preamble to the memory, and transmitting an interrupt signal to the processor comprises:
- storing, by the baseband, the receiving termination time of the preamble to the memory, and transmitting the interrupt signal to the processor after the baseband receives the data packet and successfully verifies the CRC.

16. The method according to claim 14, wherein the slave device comprises: a baseband, a processor, and a memory;
the receiving, by a slave device, a data packet transmitted by the master device comprises:
- receiving, by the baseband, the data packet transmitted by the master device;

correspondingly, the determining, by the slave device, a receiving termination time of the preamble, and determining, according to the receiving termination time of the preamble and a delay time configured by the master device for the slave device, a synchronization time with other slave devices in the N slave devices comprises:
- determining, by the baseband, the receiving termination time of the preamble, and storing the receiving termination time of the preamble to the memory, and transmitting an interrupt signal to the processor; and
- acquiring, by the processor, the receiving termination time of the preamble from the memory according to the interrupt signal, and determining, according to the receiving termination time of the preamble and the delay time configured by the master device for the slave device, the synchronization time with the other slave devices in the N slave devices;

wherein the determining, by the processor, according to the receiving termination time of the preamble and the delay time configured by the master device for the slave device, the synchronization time with the other slave devices in the N slave devices comprises:
- calculating, by the processor, a sum of the receiving termination time of the preamble and the delay time to obtain the synchronization time.

17. The method according to claim 14, wherein the slave device comprises: a baseband, a processor, and a memory;
the receiving, by a slave device, a data packet transmitted by the master device comprises:
- receiving, by the baseband, the data packet transmitted by the master device;

correspondingly, the determining, by the slave device, a receiving termination time of the preamble, and determining, according to the receiving termination time of the preamble and a delay time configured by the master device for the slave device, a synchronization time with other slave devices in the N slave devices comprises:
- determining, by the baseband, the receiving termination time of the preamble, and storing the receiving termination time of the preamble to the memory, and transmitting an interrupt signal to the processor; and
- acquiring, by the processor, the receiving termination time of the preamble from the memory according to the interrupt signal, and determining, according to the receiving termination time of the preamble and the delay time configured by the master device for the slave device, the synchronization time with the other slave devices in the N slave devices;

wherein the determining, according to the receiving termination time of the preamble and the delay time configured by the master device for the slave device, the synchronization time with the other slave devices in the N slave devices comprises:

calculating, by the processor, a sum of the receiving termination time of the preamble, the delay time and a preset value to obtain the synchronization time.

18. The method according to claim 14, wherein the slave device comprises a baseband;

the receiving, by a slave device, a data packet transmitted by the master device comprises:

receiving, by the baseband, the data packet transmitted by the master device; and correspondingly, the determining, by the slave device, a receiving termination time of the preamble, and determining, according to the receiving termination time of the preamble and a delay time configured by the master device for the slave device, a synchronization time with other slave devices in the N slave devices comprises:

determining, by the baseband, the receiving termination time of the preamble, and determining, according to the receiving termination time of the preamble and the delay time configured by the master device for the slave device, the synchronization time with the other slave devices in the N slave devices.

19. The method according to claim 18, wherein the determining, according to the receiving termination time of the preamble and the delay time configured by the master device for the slave device, the synchronization time with the other slave devices in the N slave devices comprises:

calculating, by the baseband, a sum of the receiving termination time of the preamble and the delay time through a hardware circuit of the baseband to obtain the synchronization time.

20. The method according to claim 14, wherein the receiving termination time of the preamble by the slave device is different from receiving termination times of preambles by the other slave devices in the N slave devices.

* * * * *